(12) United States Patent
Mauro et al.

(10) Patent No.: US 8,013,638 B2
(45) Date of Patent: Sep. 6, 2011

(54) CIRCUIT FOR THE GENERATION OF PULSE-WIDTH MODULATION SIGNALS, PARTICULARLY FOR A SATELLITE RECEPTION SYSTEM

(75) Inventors: Sergio Riccardo Mauro, Catania (IT); Sergio Fabiano, Syracuse (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 62 days.

(21) Appl. No.: 12/516,796

(22) PCT Filed: Nov. 13, 2007

(86) PCT No.: PCT/EP2007/062246
§ 371 (c)(1),
(2), (4) Date: May 28, 2009

(87) PCT Pub. No.: WO2008/064994
PCT Pub. Date: Jun. 5, 2008

(65) Prior Publication Data
US 2010/0066415 A1    Mar. 18, 2010

(30) Foreign Application Priority Data
Nov. 29, 2006   (IT) .............................. MI2006A2294

(51) Int. Cl.
*H04L 25/49* (2006.01)
(52) U.S. Cl. ......... 327/100; 327/172; 327/178; 327/306
(58) Field of Classification Search ............ 327/172, 327/100, 178
See application file for complete search history.

(56) References Cited

U.S. PATENT DOCUMENTS

| | | | |
|---|---|---|---|
| 5,182,467 A * | 1/1993 | Taylor et al. | 327/175 |
| 6,617,916 B1 * | 9/2003 | Kurotsu | 327/544 |
| 6,762,636 B1 * | 7/2004 | Khawshe | 327/175 |

(Continued)

FOREIGN PATENT DOCUMENTS

GB          2304478         3/1997

OTHER PUBLICATIONS

International Search Report for International Application No. PCT/EP2007/062246, European Patent Office, May 9, 2008, (pp. 3).

(Continued)

*Primary Examiner* — Lincoln Donovan
*Assistant Examiner* — Ryan C Jager
(74) *Attorney, Agent, or Firm* — Lisa K. Jorgenson; Kevin D. Jablonski; Graybeal Jackson LLP

(57) ABSTRACT

An embodiment of regulation and shaping circuit includes a first input terminal for receiving a first input signal with a first frequency; a second input terminal for receiving a second input signal with a second frequency higher than the first frequency; a first circuital branch coupled to the first input terminal and, through first coupling means active at the first frequency, to an output terminal for providing an output signal; a second circuital branch coupled to the second input terminal and to the output terminal, wherein said second circuital branch comprises a negative feedback circuital loop adapted to control the output signal according to the second input signal.

41 Claims, 4 Drawing Sheets

U.S. PATENT DOCUMENTS

| | | | |
|---|---|---|---|
| 7,271,635 B2 * | 9/2007 | Baker et al. | 327/175 |
| 2003/0016021 A1 * | 1/2003 | Hocken et al. | 324/416 |
| 2004/0184598 A1 * | 9/2004 | Holcombe et al. | 379/399.01 |
| 2006/0232312 A1 * | 10/2006 | Baker et al. | 327/175 |
| 2007/0184595 A1 * | 8/2007 | Miura et al. | 438/171 |
| 2009/0128209 A1 * | 5/2009 | Chu et al. | 327/177 |

OTHER PUBLICATIONS

Meng Tong Tan, Joseph S. Chang, Hock Chuan Chua, and Bah Hwee Gwee, "An Investigation Into the Parameters Affecting Total Harmonic Distortion in Low-Voltage Low-Power Class-D Amplifiers", IEEE Transactions on Circuits and Systems-I: Fundamental Theory and Applications, vol. 50, No. 10, Oct. 2003, pp. 1304-1315.

* cited by examiner

US 8,013,638 B2

CIRCUIT FOR THE GENERATION OF PULSE-WIDTH MODULATION SIGNALS, PARTICULARLY FOR A SATELLITE RECEPTION SYSTEM

PRIORITY CLAIM

The present application is a national phase application filed pursuant to 35 USC §371 of International Patent Application Serial No. PCT/EP2007/062246, filed Nov. 13, 2007; which further claims the benefit of Italian Patent Application MI2006A002294, filed Nov. 29, 2006; all of the foregoing applications are incorporated herein by reference in their entireties.

TECHNICAL FIELD

An embodiment of the present invention relates to the field of circuits for the generation of signals to be used in pulse-width modulation communication protocols, particularly of the type used in satellite communication systems and in particular in apparatus for the reception of signals from artificial satellites.

BACKGROUND

Satellite communication systems have several applications. For example they are used in the field of television, mobile telephony, and terrestrial and sea navigation. In such systems, the exchange of information is based on the propagation of a signal via satellite connections, which cover long distances without the use of particular infrastructures along the covered distances.

For example, satellite television is a system consisting of an artificial satellite able to receive a television signal from one or more transmitter stations and directly retransmit it to different users. Each user is provided with one or more receiving antennas (such as parabolic antennas) which are directed towards one or more satellites, which antennas receive the television signal, perform a first conversation/selection of the high-frequency satellite signal and send it to a decoder (Set-Top Box) to which they are connected by a coaxial cable. The decoder is able to process the received television signal so that it can be exploited by the user through normal television apparatuses. The decoder forms what is referred to as the Internal Decoding Unit ("IDU"), whereas the receiving antennas form the Out Decoding Unit ("ODU").

In digital satellite television, the television signal processed by the decoder is in particular a digital signal.

In some application, the decoder interacts with each receiving antenna using a communication protocol which requires the superimposing of a low frequency signal (for example, at 22 KHz) with a pulse width keying on a DC signal forming the supply voltage, which is provided to each receiving antenna by the decoder itself.

In order to guarantee the correct exchange of information between each receiving unit and the decoder, it is necessary that the low frequency signal complies with particular requirements. For example, in the case in which the low frequency signal is a square wave, it is required that the amplitude thereof, the rising and falling time, the duty-cycle thereof (defined as the ratio between the time in which the signal is at the high voltage level and the period of the signal) take predetermined values.

For this purpose, the decoders have regulation and shaping circuits adapted to provide the low frequency signal having the desired features.

Examples of regulation and shaping circuits of the low frequency signal are known in the art.

In FIG. 1 an example of a conventional regulation and shaping circuit 100 of low frequency signal of the above-mentioned type is shown.

The shaping and regulation circuit 100 receives in input an input voltage signal Vin and provides in output an output voltage signal Vout adapted for being used as a low frequency signal.

For this purpose, the shaping and regulation circuit 100 comprises an input terminal 105 which receives the input voltage signal Vin, and an output terminal 110 which sends to a coaxial cable 115 to which it is connected the output voltage signal Vout. In the example at issue, the input voltage signal Vin consists of a square wave oscillating between a first predetermined voltage $Vin'^*$ and a second predetermined voltage $Vin''^*$, with a frequency f1 (for example, 22 kHz). Typically, the first predetermined voltage $Vin'^*$ and the second predetermined voltage $Vin''^*$ take positive values so that also the output voltage signal takes positive values (indeed, the communication protocol between the decoder and each receiving antenna provides for the use of voltage signals which take values higher than zero).

In detail, the regulation and shaping circuit 100 includes a differential amplifier 120 having a relatively high gain (for example, ranging between 60 dB and 80 dB). The differential amplifier 120 has an inverting input terminal (denoted in FIG. 1 with the symbol "−") and a non-inverting input terminal (denoted in FIG. 1 with the symbol "+"). The differential amplifier 120 receives as power supply a reference voltage, for example ground, and a power supply voltage Vdd (for example, 20V). Typically, the supply voltage Vdd is higher than the maximum voltage value which can be reached by the output voltage signal Vout. The non-inverting terminal of the differential amplifier 120 is connected to the input terminal 105, whereas the inverting terminal is connected to a first terminal of a resistor R1, which has a second terminal kept to ground. The resistor R1 has the first terminal connected to a first terminal of a resistor R2, which has a second terminal connected to the output terminal 110 of the regulation and shaping circuit 100. An npn bipolar transistor T1 is connected between an output terminal 125 of the differential amplifier 120 and the output terminal 110 of the regulation and shaping circuit 100. In particular, the transistor T1 has an emitter terminal connected to the output terminal 110, a base terminal connected to the output terminal 125 of the differential amplifier 120 and a collector terminal, which receives the supply voltage Vdd.

The regulation and shaping circuit 100 provides for the use of a negative feedback control loop (comprising the differential amplifier 120, the transistor T1, the resistor R1 and the resistor R2) for controlling and setting the output voltage signal Vout. In particular, the differential amplifier 120 is connected to the network formed by the resistors R1 and R2 and by the transistor T1 according to a conventional non-inverting configuration.

In response to the input voltage signal Vin (applied to the input terminal 105) the regulation and shaping circuit 100 provides at the output terminal 110 the output voltage signal Vout having a square shape wave, whose amplitude is a function of the resistance of the resistors R1 and R2. In particular, the output voltage signal Vout has an average value substantially equal to the supply voltage to be provided by the decoder to each receiving antenna and it is used as a low frequency signal (with a dynamic range of the order of some thousands of mV) during the exchange of information between the decoder and each receiving antenna.

A drawback of such solution is that for the output voltage signal Vout not to be distorted (thereby keeping the amplitude needed for the correct transmission of the signal), it may be necessary to provide an output circuit (for example, of push-pull type) connected to the output terminal 110. This causes an increase of the area occupied by the regulation and shaping circuit 100 in a semiconductor chip in which it is integrated. On the other hand, to guarantee the integrity of the wave shape of the output voltage signal Vout it may be needed to increase the voltage drop at the transistor T1, thus increasing the circuit consumption.

Moreover, the frequency of the output voltage signal Vout depends on the pass band of the regulation and shaping circuit (with negative feedback) 100. In particular, the maximum obtainable frequency of the output voltage signal Vout is limited by the pass band of the regulation and shaping circuit 100. This can cause an undesired shift of the frequency of the output voltage signal Vout from the provided one.

FIG. 2 shows another conventional regulation and shaping circuit 200. The regulation and shaping circuit 200 receives in input a first reference voltage Vref and an input voltage signal Vin1, and provides in output an output voltage signal Vout1, consisting of a low frequency signal, superimposed on a DC voltage.

For this purpose, the regulation and shaping circuit 200 includes a first input terminal 205, through which it receives the first input reference voltage Vref, a second input terminal 210 through which it receives the input voltage signal Vin1, and an output terminal 215. In the example at issue, the first reference voltage Vref takes a constant value for example, 1.25V; the input voltage signal Vin1 consists of a square wave ranging from a first voltage value V1 (for example, the ground) to a second voltage value V2 (for example, 1V) with the frequency f1 (for example, 22 kHz).

The regulation and shaping circuit 200 includes a regulation circuital structure 100' similar to that of the regulation and shaping circuit 100 (for this reason similar elements are denoted with the same reference numerals with the addition of an apex), which is connected to the input terminal 205. In this case, the emitter terminal of the transistor T1' is coupled to the output terminal 215 by means of an impedance Z1. In particular, the impedance Z1 has a first terminal connected to the emitter terminal of the transistor T1' and a second terminal coupled to the coaxial cable 115; moreover, the impedance Z1 consists of an inductor L1 which is connected in parallel to a resistor R3.

An n-channel MOSFET T2 has a drain terminal, which is connected to the output terminal 215, a control terminal, which is connected to the second input terminal 210, and a source terminal, which is connected to a first terminal of a resistor R4. The resistor R4 has a second terminal kept to ground.

During the operation of the regulation and shaping circuit 200, the output voltage signal Vout1 is obtained by superimposing on a DC output voltage signal due uniquely to the first reference voltage Vref (when the second input terminal 210 is kept to ground), a low frequency voltage signal due uniquely to the input voltage signal Vin1 (that is the signal which it should be observed at the output terminal 215 when the first input terminal 205 is at ground).

When the regulation and shaping circuit 200 receives only the first reference voltage Vref and the input voltage signal Vin1 is kept to ground, the transistor T2 is turned off so that no current flows in the circuital branch formed by the transistor T2 and by the resistor R4. The output terminal 215 reaches a constant value which, similarly to the case of FIG. 1, depends on the value of the first reference voltage Vref and on the ratio between the resistances of the two resistors R1' and R2' (for very low frequencies, the inductor L1 has a very low resistance, ideally it is a short-circuit, so that the voltage reached by the emitter terminal of the transistor T1' is directly transmitted to the output terminal 215).

When the regulation and shaping circuit 200 receives only the input voltage signal Vin1 and the first reference voltage Vref is kept to ground, the regulation circuit 100' is inhibited, whereas the circuital branch formed by the transistor T2 and by the resistor R4 is conductive. In particular, in response to the input voltage signal Vin1, the output terminal 215 provides an output voltage signal having a square wave shape with a frequency equal to the frequency of the input voltage signal Vin1.

In particular, the input voltage signal Vin1 generates in output a signal having a small amplitude with respect to the DC value. Therefore, the output voltage signal Vout1 is formed by a DC voltage value—for example, ranging from 13V to 18V—effect of the first reference voltage Vref– to which a small signal of 22 KHz is superimposed having a peak-to-peak amplitude significantly lower than the DC voltage value (for example, approximately 700 mV).

In other words, the output voltage signal Vout1 obtained by the superposition of the effects of the first reference voltage Vref and the input voltage signal Vin1, consists of a square wave having a frequency depending on the frequency of the input voltage signal Vin1 and average value function of the first reference voltage Vref. In particular, such average value corresponds to the DC supply voltage to be provided to each receiving antenna, whereas the output voltage signal due to the input voltage signal Vin1 is adapted to be used as a low frequency signal for communicating with the receiving antennas.

It should be noted that the use of the transistor T2 implies a lower control of the wave shape of the output voltage signal Vout1. Indeed, the lack of a negative feedback may prevent stabilizing the output voltage signal Vout1 and thus the low frequency signal.

Moreover, the amplitude of the output voltage signal Vout1 depends not only on the values of the resistance of the resistors R1' and R2', but also on the impedance Z1 and on the impedance of the coaxial cable 115', so that it may not be possible to obtain an output voltage signal Vout1 having an amplitude equal to the desired one.

SUMMARY

An embodiment of the present invention provides a solution, which is based on the idea of controlling the output voltage signal by a negative feedback and a de-coupling element.

In particular, an embodiment of the present invention proposes a regulation and shaping circuit comprising: a first input terminal for receiving a first input signal with a first frequency; a second input terminal for receiving a second input signal with a second frequency higher than the first frequency; a first circuital branch coupled to the first input terminal and, through first coupling means active at the first frequency, with an output terminal, for providing an output signal; a second circuital branch coupled to the second input terminal and to the output terminal, wherein said second circuital branch comprises a negative feedback circuital loop adapted to control the output signal according to the second input signal.

These and other features and advantages of one or more embodiments of the present invention will be made apparent by the following detailed description of an embodiment thereof, provided merely by way of non-limitative example, description that will be conducted making reference to the attached drawings. In particular:

DETAILED DESCRIPTION

Figure 3:
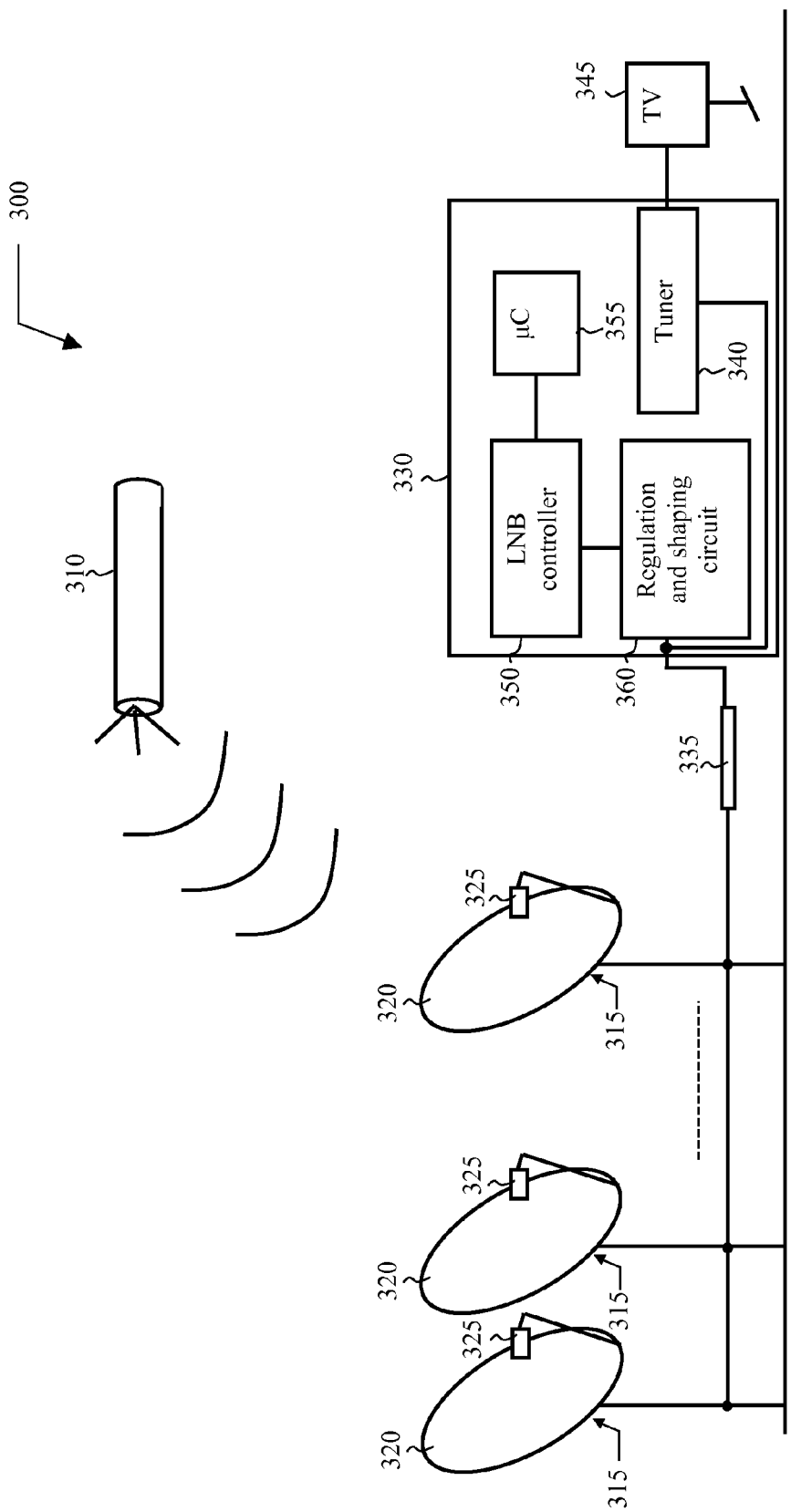
FIG. 3 shows a schematic block diagram of a satellite communication system wherein the solution according to an embodiment of the present invention is usable.

With reference to FIG. 3, a communication satellite system 300 for television applications is shown. An artificial satellite 310 is placed in orbit around the earth. For example, the orbit can be of geostationary type, in such a way that, for an observer on the earth, the artificial satellite 310 seems motionless in the sky. The artificial satellite 310 receives a television signal by a transmitter station (not shown in figure) and retransmits it to receiving antennas 315 (in the example at issue there are shown eight) placed on the earth. For this purpose, the artificial satellite 310 is provided with systems which serve the operation thereof, like one or more transponder units or electronic processors able to support the processing of received signals directly on-board of the satellite.

Each receiving antenna 315 includes a parabolic mirror 320, and an illuminator 325. A circuit of first conversion/selection of the satellite signal, known as "Low Noise Block" or LNB, is associated with the illuminator. The parabolic mirror has a paraboloid shape (that is of a rotation solid obtained from the rotation of a parabola around an axis) and it is turned to the artificial satellite 310, from which it receives the satellite signal with significantly high frequencies (for example, from 10.7 GHz to 12.7 GHz). The received signal is then reflected to the illuminator 325, which is placed at the focus of the parabolic mirror 320, in such a way to receive all the power of the carrier signal received by the parabolic mirror 320. In such a way, the power of the received signal is sufficiently high for being adequately sent to and processed by a decoder 330 to which each LNB is connected by a coaxial cable 335.

In particular, the decoder 330, for exchanging information with the LNBs placed on the receiving antennas 315, uses a type of protocol thanks to which it can control several receiving antennas 315 connected to the same coaxial cable 335. For example, the communication between the receiving antennas 315 and the decoder 330 can be based on the DISEqC (Digital Satellite Equipment Control) protocol, which allows managing up to eight input signals on the single coaxial cable 335.

The decoder 330 has, among the main functions, that of processing the received signal, for making it usable by the user through a television apparatus. For this purpose, the decoder 330 includes all the circuits needed for performing the demodulation and the decoding of the received signal, which has been previously coded by the emitter at the transmission time. For this purpose, a tuner 340 is provided, which allows selecting among the received signals the ones to be sent to a television set 345.

For controlling the LNBs on the antennas, the decoder 330 includes an LNB controller 350, which sends the control signals to the LNBs 325 and moreover provides thereto the supply voltage. A micro-controller 355 is able to control the operations performed by the LNB controller 350.

In order to implement the communication protocol for the correct exchange of information between the decoder 330 and each receiving antenna 315, a regulation and shaping circuit 360 is interposed between the LNB controller 350 and the coaxial cable 335. In this way, a signal from the LNB controller 350 is converted into a low frequency signal, typically 22 KHz, adapted to be used as a low frequency signal to be superimposed onto the supply voltage for the exchange of information between the decoder 330 and the LNB on each receiving antenna 315.

Figure 4:
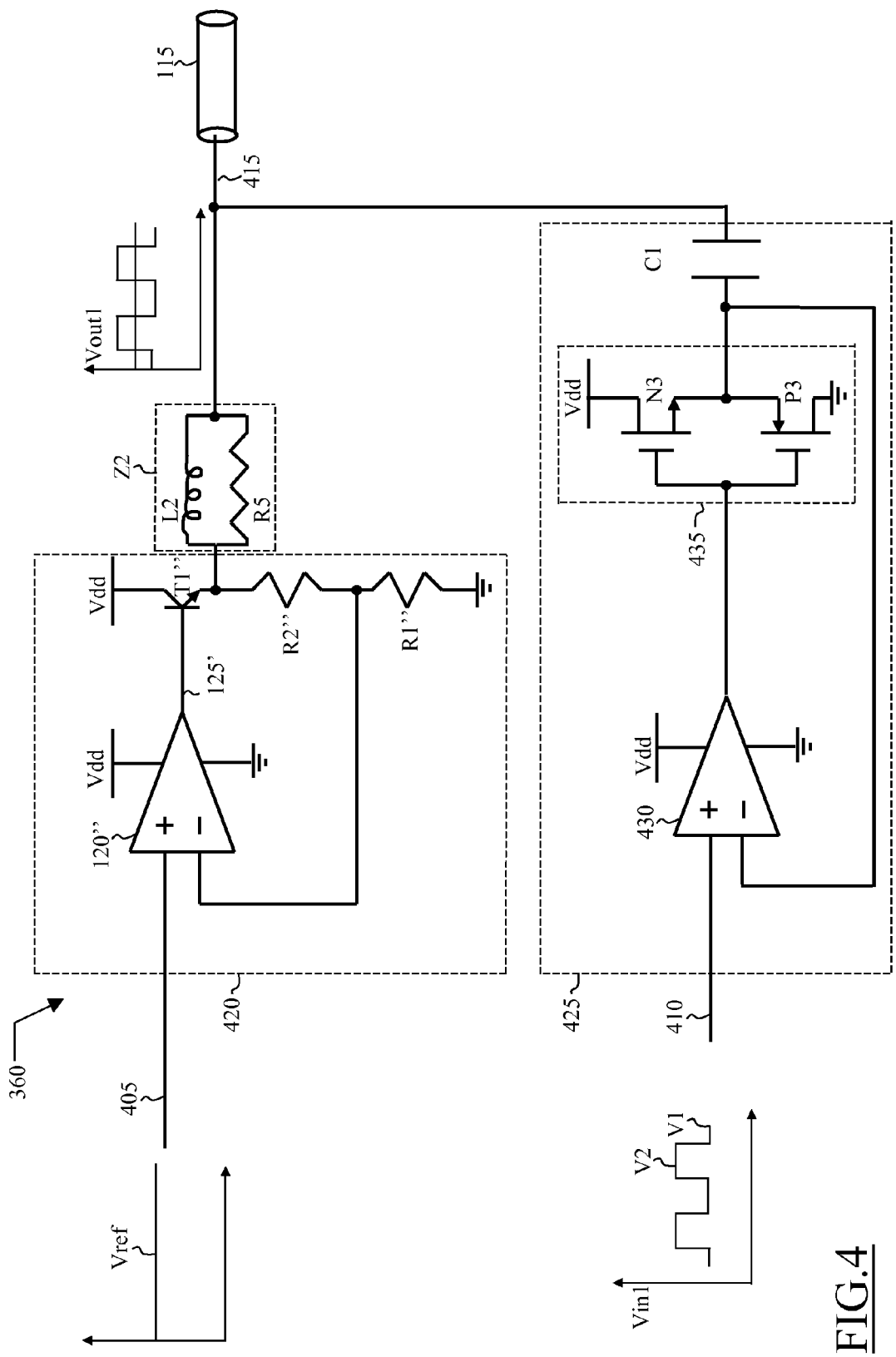
FIG. 4 shows a circuit schematic of a regulation and shaping circuit according to an embodiment of the present invention.

With reference to FIG. 4, the circuit schematic of the regulation and shaping circuit 360 according to an embodiment of the present invention is shown.

The regulation and shaping circuit 360 receives in input the first reference voltage Vref and the input voltage signal Vin1 and provides in output the output voltage signal Vout1 adapted to be used as supply voltage for the LNBs and as a low frequency signal during the exchange of information between the decoder and each receiving antenna.

For this purpose, the regulation and shaping circuit 360 comprises a first input terminal 405 through which it receives the first reference voltage Vref, a second input terminal 410, through which it receives the input voltage signal Vin1, and the output terminal 415.

In the example herein considered, the first reference voltage Vref takes a constant value. Alternatively, the terminal 405 can receive an input voltage signal having a very low frequency. The input voltage signal Vin1 includes a square wave, which is modulated by variable width pulses.

The regulation and shaping circuit 360 includes a first and second circuital branches 420 and 425 placed respectively between the first input terminal 405 and the output terminal 415, and between the second input terminal 410 and the output terminal 415.

Figure 1:
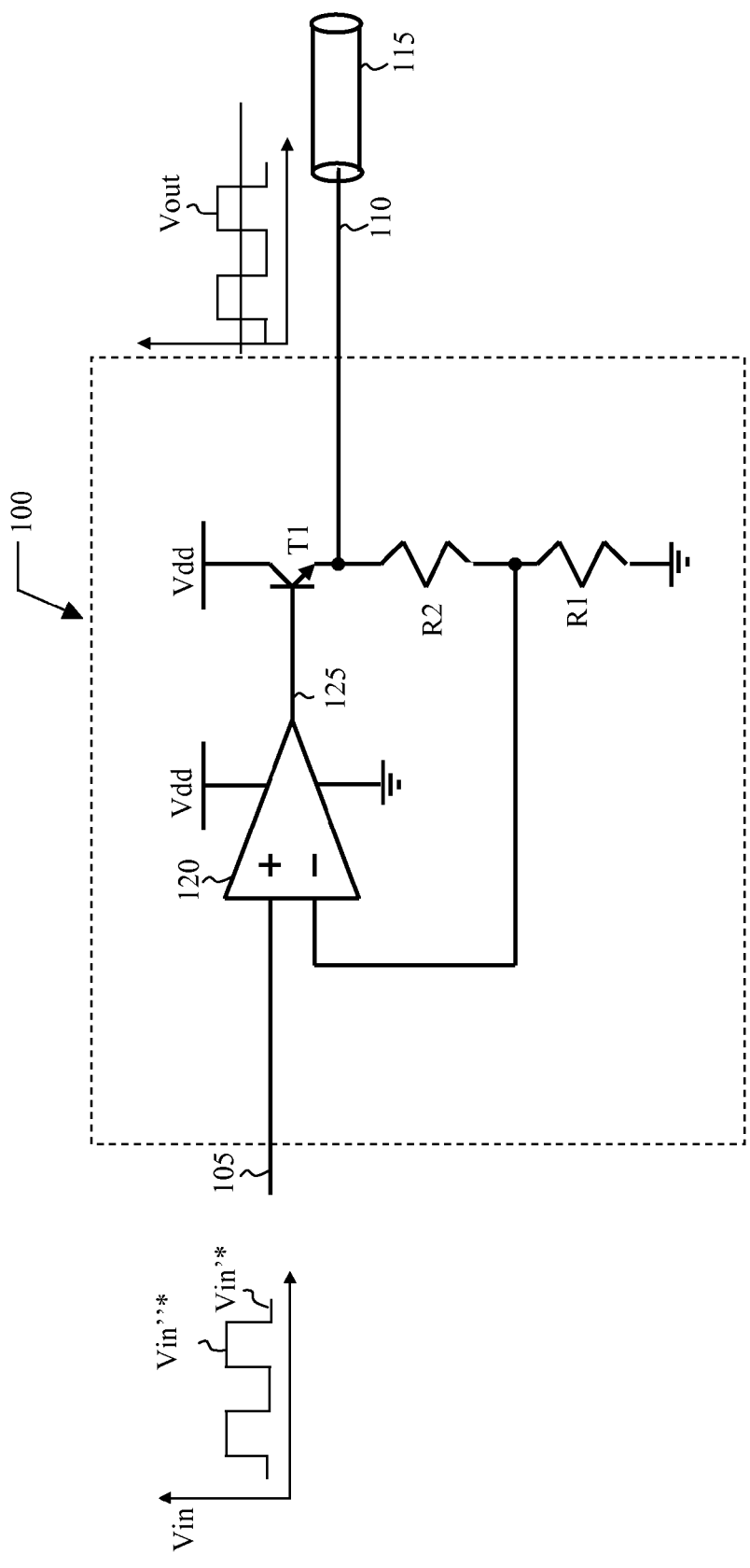
FIG. 1 shows a circuit schematic of a known regulation and shaping circuit.

The first circuital branch 420 has a structure similar to the regulation and shaping circuit 100 shown in FIG. 1 (for this reason, similar elements are denoted with the same reference numerals, adding two apexes). The first circuital branch 420 is connected to the output terminal 415 by an impedance Z2, which comprises an inductor L2 connected in parallel to a resistor R5.

The second circuital branch 425 includes a differential amplifier 430 having a relatively high gain (for example, ranging from 60 dB to 80 dB). The differential amplifier 430 has an inverting input terminal (denoted in FIG. 4 with the symbol "−") and a non-inverting input terminal (denoted in FIG. 4 with the symbol "+"). The differential amplifier 430 receives as a supply the ground and the supply voltage Vdd (for example, ranging from 12V to 18V). The non-inverting terminal of the differential amplifier 430 is connected to the second input terminal 410, whereas the inverting terminal is connected to a first terminal of a capacitor C1, which has a second terminal, connected to the output terminal 415. An output circuit or stage 435 is placed between an output terminal of the differential amplifier 430 and the first terminal of the capacitor C1. In the example at issue, the output circuit 435 comprises an n-channel MOS transistor N3 and a p-channel MOS transistor P3. The transistors N3 and P3 are connected in a push-pull configuration and have the corresponding control terminals connected to the output terminal of the differential amplifier 430, and the source terminals connected to the inverting terminal of the differential amplifier 430; moreover, the transistor N3 has a drain terminal which receives the supply voltage Vdd, whereas the transistor P3 has a drain terminal which is kept to ground. Alternatively, different types of transistors can be used, for example the output stage 435 can comprise bipolar transistors. Moreover, the output stage 435 may have a different structure, for example it may have an emitter-follower configuration.

The regulation and shaping circuit 360 provides for using a negative feedback control loop, comprising the differential amplifier 430 and the output circuit 435, in order to control and stabilize the output voltage signal Vout1. In particular, the differential amplifier 430 and the output circuit 435 are connected to each other according in a typical non-inverting configuration having a unit gain.

During the operation of the regulation and shaping circuit 360, the output voltage signal Vout1 is obtained by the superposition of a DC output voltage due uniquely to the first reference voltage Vref (visible by keeping to ground the second output terminal 410) with an output voltage signal due uniquely to the input voltage signal Vin1 (visible by keeping to ground the first input terminal 405).

When the regulation and shaping circuit 360 receives only the reference voltage Vref and the input voltage signal Vin1 is kept to ground, the circuital branch 425 is disabled, so that no current flows therethrough. In DC regime, the capacitor C1 is an open circuit, so that possible fluctuations of the voltage reached by the source terminal of the transistors N3 and P3 do not interfere in any way on the voltage reached by the output terminal 415 of the circuit.

Figure 2:
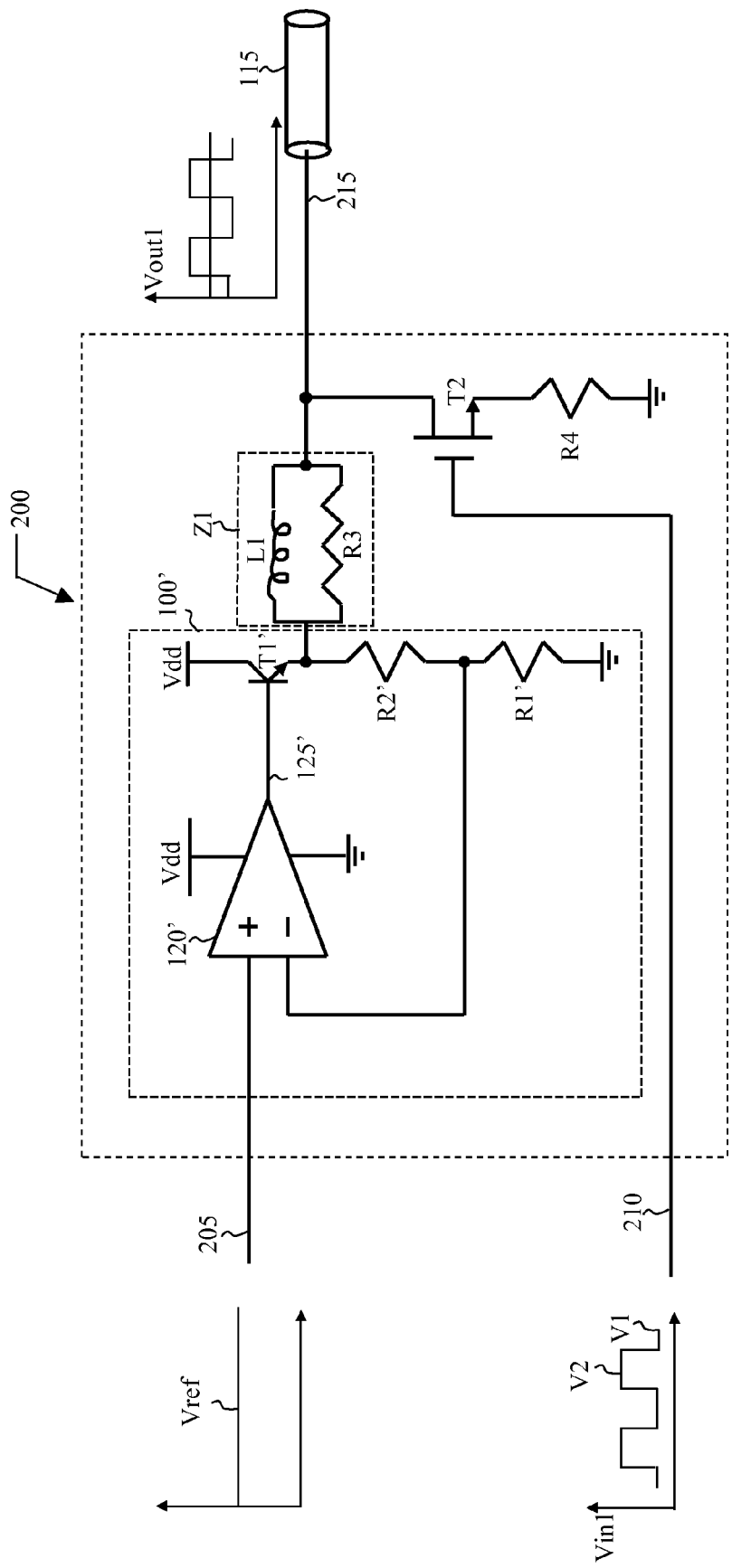
FIG. 2 shows a circuit schematic of a further known regulation and shaping circuit.

Similarly to the case of FIG. 1 and FIG. 2, the emitter terminal of the transistor T1" reaches a voltage depending on the value of the first reference voltage Vref and on the value of the resistances of the resistors R1" and R2". Such voltage value is reached also by the output terminal 415, since the impedance Z2, for frequencies close to zero, forms a low impedance circuital path (ideally, a short circuit).

When only the input voltage signal Vin1 is applied to the regulation and shaping circuit 360, whereas the reference voltage Vref is kept to ground, no current flows through the circuital branch comprising the transistor T1" and the resistors R2" and R1", and the emitter terminal of the transistor T1" reaches the ground. However, such value does not interfere in any way with the value reached by the output terminal 415, since at the frequencies of the input signal Vin1 the impedance Z2 has a very high resistive component (equal to the resistance of the resistor R5). For this purpose, the resistor R5 is chosen in such a way to have a significantly high resistance (ideally infinite, so that the impedance Z2 forms an open circuit).

The circuital branch 425 transfers the input voltage signal Vin1 to the non-inverting terminal of the differential amplifier 430 by means of the negative feedback loop comprising the differential amplifier 430 and the output circuit 435. Moreover, the input voltage signal Vin1 is directly transferred also to the output terminal 415 at the frequency of the input signal Vin1, since the capacitor C1 has a low impedance (ideally a short-circuit).

The output voltage signal Vout1 obtained by superposing the effects due to the first reference voltage Vref and to the input voltage signal Vin1, consists of a square wave with a frequency equal to the frequency of the input voltage signal Vin1 with an average value depending on the reference voltage Vref.

However, it is possible to control the frequency of the output voltage signal Vout1 provided by the regulation and shaping circuit 360 to the LNB by means of the input voltage signal Vin1. Thus, the circuit according to an embodiment of the present invention allows varying (for example, increasing) the frequency of the output voltage signal Vout1 by acting on the input voltage signal Vin1 exclusively.

In particular, the use of the negative feedback loop allows controlling the frequency, the duty-cycle and the rising and falling time of the output voltage signal Vout1 so as to avoid that possible departures of its wave shape from the desired one cause an error during the exchange of information between the decoder and each receiving antenna.

Moreover, it is possible to control the average value of the output voltage signal Vout1 by the resistances of the resistors R1" and R2". In particular, such values are chosen in such a way that the DC component of the output voltage signal Vout1 has a value equal to the supply voltage (for example, ranging between 13V to 18V) to be supplied to each receiving antenna.

It should be noted that, also in this case, the output voltage signal Vout1 is formed by the DC voltage value to which a small signal of 22 KHz is superimposed having a peak-to-peak amplitude significantly lower than the DC voltage value (for example, approximately 700 mV).

For high frequencies, the use of the impedance Z2 having a high significantly resistive component (ideally an open circuit) allows decoupling the emitter terminal of the transistor T1" from the coaxial cable 315 to which it is connected. In such a way, for frequencies equal to at least the frequency of the input signal Vin, the voltage value reached by the output terminal 415 is not affected by the low output resistance of the emitter terminal of the transistor T1", so that the obtained low frequency signal may be exactly superimposed to the DC value.

Naturally, in order to satisfy local and specific requirements, a person skilled in the art may apply to the solution described above many modifications and alterations. Particularly, although one or more embodiments of the present invention have been described with a certain level of detail, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, the possibility of using an embodiment of the present invention in fields different from that of the satellite communication systems is not excluded. For example, the regulation and shaping circuit 360 may be used in any type of application where it is required that a signal having a predetermined frequency, duty-cycle, rising and falling time is superimposed on a continuous voltage.

In any case, different waves shape of the input voltage signals are possible (for example, sinusoidal).

Even if in the preceding description a reference has been made to a regulation and shaping circuit integrated in a semiconductor material chip, it is not excluded that the proposed regulation and shaping circuit can be realized on a physical support (such as a printed circuit board—PCB) using discrete components.

Naturally, in order to satisfy local and specific requirements, a person skilled in the art may apply to the embodiments described above many modifications and alterations. Particularly, although one or more embodiments have been described with a certain degree of particularity, it should be understood that various omissions, substitutions, and changes in the form and details as well as other embodiments are possible. Moreover, it is expressly intended that specific elements and/or method steps described in connection with any disclosed embodiment may be incorporated in any other embodiment as a general matter of design choice.

The invention claimed is:

1. A regulation and shaping circuit comprising:
a first input terminal for receiving a first input signal with a first frequency;
a second input terminal for receiving a second input signal with a second frequency higher than the first frequency;
a first circuital branch coupled to the first input terminal and, through first coupling circuit that reacts in a first manner to a signal at the first frequency and reacts in a second manner to a signal at the second frequency, coupled to an output terminal for providing an output signal;
a second circuital branch coupled to the second input terminal and to the output terminal,
wherein said second circuital branch includes a negative feedback circuital loop adapted for controlling the output signal according to the second input signal.

2. The circuit according to claim 1, wherein said second circuital branch is active on the output signal at the second frequency.

3. The circuit according to claim 2, further comprising a second coupling circuit in the negative feedback circuital loop to the output terminal active at the second frequency.

4. The circuit according to claim 1, wherein said second coupling circuit comprises at least one capacitor which has a first terminal coupled to said circuital loop and a second terminal coupled to the output terminal.

5. The circuit according to claim 1, wherein the feedback circuital loop comprises a differential amplifier and an output circuit, said differential amplifier having a non-inverting input terminal coupled to the second input terminal and an inverting input terminal coupled to the first output terminal of the output circuit.

6. The regulation and shaping circuit according to claim 1, wherein the first input signal has a zero frequency.

7. A regulation and shaping circuit comprising:
a first input terminal for receiving a first input signal with a first frequency;
a second input terminal for receiving a second input signal with a second frequency higher than the first frequency;
a first circuital branch coupled to the first input terminal and, through first coupling circuit that is active at the first frequency, coupled to an output terminal for providing an output signal;
a second circuital branch coupled to the second input terminal and to the output terminal,
wherein said second circuital branch includes a negative feedback circuital loop adapted for controlling the output signal according to the second input signal;
wherein said first coupling means includes at least one inductor which has a first terminal coupled to the first circuital branch and a second terminal coupled to the output terminal, said inductor being connected in parallel to a resistor.

8. A regulation and shaping circuit comprising:
a first input terminal for receiving a first input signal with a first frequency;
a second input terminal for receiving a second input signal with a second frequency higher than the first frequency;
a first circuital branch coupled to the first input terminal and, through first coupling circuit active at the first frequency, coupled to an output terminal for providing an output signal;
a second circuital branch coupled to the second input terminal and to the output terminal,
wherein said second circuital branch includes a negative feedback circuital loop adapted for controlling the output signal according to the second input signal
wherein the feedback circuital loop comprises a differential amplifier and an output circuit, said differential amplifier having a non-inverting input terminal coupled to the second input terminal and an inverting input terminal coupled to the first output terminal of the output circuit; and
wherein the output circuit comprises a push-pull stage.

9. The circuit according to claim 8, wherein the output circuit comprises a first transistor and a second transistor in series to the first transistor, the first transistor having a current conduction terminal coupled to a supply voltage, a second current conduction terminal coupled to a second current conduction terminal of the second transistor, the second transistor having a first current conduction terminal coupled to ground, the first transistor and the second transistor having a corresponding control terminal coupled to an output terminal of the differential amplifier.

10. The regulation and shaping circuit according to claim 9, wherein the first transistor and the second transistor are MOSFET.

11. A method of generating an electric signal at an output terminal of a circuit, the method comprising:
transferring onto the output terminal a first input signal having a first frequency,
applying to the output terminal a signal corresponding to a second input signal at a second frequency higher than the first frequency, said applying being performed by a negative feedback control circuital loop;
wherein said transferring is substantially inhibited at said second frequency when compared to the first frequency.

12. The method of claim 11, further including decoupling the control circuital loop from the output terminal at said first frequency.

13. A circuit, comprising:
a first circuit input node operable to receive a first reference signal;
a second circuit input node operable to receive a first communication signal;
a circuit output node;
a reference generator coupled to the first input node, operable to generate on the output node a second reference signal in response to the first reference signal, and having at the output node an impedance that increases with frequency; and
a communication-signal generator coupled to the second input node, operable to superimpose on the second reference signal a second communication signal in response to the first communication signal, and having at the output node an impedance that decreases with frequency.

14. The circuit of claim 13 wherein the first reference signal comprises a first reference voltage.

15. The circuit of claim 13 wherein the first reference signal comprises a first substantially constant reference voltage.

16. The circuit of claim 13 wherein the first communication signal comprises a first pulse-width-modulated communication voltage.

17. The circuit of claim 13 wherein the reference generator comprises:
a differential amplifier having a first amplifier input node coupled to the first circuit input node, a second amplifier input node, and an amplifier output node coupled to the second amplifier input node; and a low-pass filter coupled between the amplifier output node and the circuit output node.

18. The circuit of claim 13 wherein the reference generator comprises:
   first and second supply nodes;
   a differential amplifier having a non-inverting input node coupled to the first circuit input node, an inverting input node, and an amplifier output node;
   a transistor having a control node coupled to the amplifier output node, a first conduction node coupled to the first supply node, and a second conduction node;
   a voltage divider coupled between the second conduction node of the transistor and the second supply node and having a tap node coupled to the inverting input node of the differential amplifier; and
   an inductor coupled between the second conduction node of the transistor and the circuit output node.

19. The circuit of claim 13 wherein the communication-signal generator comprises:
   a differential amplifier having a first amplifier input node coupled to the second circuit input node, a second amplifier input node, and an amplifier output node coupled to the second amplifier input node; and
   a high-pass filter coupled between the amplifier output node and the circuit output node.

20. The circuit of claim 13 wherein the communication-signal generator comprises:
   a differential amplifier having a non-inverting input node coupled to the second circuit input node, an inverting input node, and an amplifier output node;
   a buffer having a buffer input node coupled to the amplifier output node and having a buffer output node coupled to the inverting input node of the amplifier; and
   a capacitor coupled between the buffer output node and the circuit output node.

21. The circuit of claim 13 wherein the communication-signal generator comprises:
   first and second supply nodes;
   a differential amplifier having a non-inverting input node coupled to the second circuit input node, an inverting input node, and an amplifier output node;
   a buffer having
      a buffer input node coupled to the amplifier output node,
      a buffer output node coupled to the inverting input node of the amplifier,
      a first transistor having a control node coupled to the buffer input node, a first conduction node coupled to the first supply node, and a second conduction node coupled to the buffer output node, and
      a second transistor having a control node coupled to the buffer input node, a first conduction node coupled to the buffer output node, and a second conduction node coupled to the second supply node; and
   a capacitor coupled between the buffer output node and the circuit output node.

22. The circuit of claim 13 wherein the communication-signal generator comprises:
   high and low supply nodes;
   a differential amplifier having a non-inverting input node coupled to the second circuit input node, an inverting input node, and an amplifier output node;
   a buffer having
      a buffer input node coupled to the amplifier output node,
      a buffer output node coupled to the inverting input node of the amplifier,
      a NMOS transistor having a control node coupled to the buffer input node, a first conduction node coupled to the high supply node, and a second conduction node coupled to the buffer output node, and
      a PMOS transistor having a control node coupled to the buffer input node, a first conduction node coupled to the buffer output node, and a second conduction node coupled to the low supply node; and
   a capacitor coupled between the buffer output node and the circuit output node.

23. A circuit, comprising:
   a first circuit input node operable to receive a first reference signal;
   a second circuit input node operable to receive a first communication signal;
   a circuit output node;
   a reference generator coupled to the first input node, operable to generate on the output node a second reference signal in response to the first reference signal, and having at the output node an impedance that increases with frequency; and
   a communication-signal generator including a differential amplifier having a first amplifier input node coupled to the second circuit input node, a second amplifier input node, and an amplifier output node coupled to the circuit output node and to the second amplifier input node.

24. The circuit of claim 23 wherein the communication-signal generator further comprises a capacitor coupled between the amplifier output node and the circuit output node.

25. The circuit of claim 23 wherein the communication-signal generator further comprises a buffer having a buffer input node coupled to the amplifier output node and having a buffer output node coupled to the circuit output node and to the second amplifier input node.

26. An integrated circuit, comprising:
   a first circuit input node operable to receive a first reference signal;
   a second circuit input node operable to receive a first communication signal;
   a circuit output node;
   a reference generator coupled to the first input node, operable to generate on the output node a second reference signal in response to the first reference signal, and having at the output node an impedance that increases with frequency; and
   a communication-signal generator coupled to the second input node, operable to superimpose on the second reference signal a second communication signal in response to the first communication signal, and having at the output node an impedance that decreases with frequency.

27. An integrated circuit, comprising:
   a first circuit input node operable to receive a first reference signal;
   a second circuit input node operable to receive a first communication signal;
   a circuit output node;
   a reference generator coupled to the first input node, operable to generate on the output node a second reference signal in response to the first reference signal, and having at the output node an impedance that increases with frequency; and
   a communication-signal generator including a differential amplifier having a first amplifier input node coupled to the second circuit input node, a second amplifier input node, and an amplifier output node coupled to the circuit output node and to the second amplifier input node.

28. A system, comprising:
a first integrated circuit, comprising
   a first circuit input node operable to receive a first reference signal,
   a second circuit input node operable to receive a first communication signal,
   a circuit output node,
   a reference generator coupled to the first input node, operable to generate on the output node a second reference signal in response to the first reference signal, and having at the output node an impedance that increases with frequency, and
   a communication-signal generator coupled to the second input node, operable to superimpose on the second reference signal a second communication signal in response to the first communication signal, and having at the output node an impedance that decreases with frequency; and
a second integrated circuit coupled to the first integrated circuit.

29. The integrated circuit of claim 28 wherein the first and second integrated circuits are disposed on a same die.

30. The integrated circuit of claim 28 wherein the first and second integrated circuits are disposed on respective dies.

31. The integrated circuit of claim 28 wherein the second integrated circuit comprises a processor.

32. A system, comprising:
a first integrated circuit, comprising
   a first circuit input node operable to receive a first reference signal,
   a second circuit input node operable to receive a first communication signal,
   a circuit output node,
   a reference generator coupled to the first input node, operable to generate on the output node a second reference signal in response to the first reference signal, and having at the output node an impedance that increases with frequency, and
   a communication-signal generator including a differential amplifier having a first amplifier input node coupled to the second circuit input node, a second amplifier input node, and an amplifier output node coupled to the circuit output node and to the second amplifier input node; and
a second integrated circuit coupled to the first integrated circuit.

33. The integrated circuit of claim 32 wherein the first and second integrated circuits are disposed on a same die.

34. The integrated circuit of claim 32 wherein the first and second integrated circuits are disposed on respective dies.

35. The integrated circuit of claim 32 wherein the second integrated circuit comprises a processor.

36. A method, comprising:
generating an output reference signal on a output node with a first circuit;
superimposing an output communication signal on the output node with a second circuit;
isolating the first circuit from the communication signal with a low-pass filter; and
isolating the second circuit from the reference signal with a high-pass filter.

37. The method of claim 36 wherein:
the reference signal comprises a substantially zero-frequency signal; and
the communication signal comprises a non-zero-frequency signal.

38. The method of claim 36 wherein isolating the first circuit comprises isolating the first circuit from the communication signal with an inductor that is serially coupled between the first circuit and the output node.

39. The method of claim 36 wherein isolating the second circuit comprises isolating the second circuit from the reference signal with a capacitor that is serially coupled between the second circuit and the output node.

40. The method of claim 36 wherein superimposing the output communication signal comprises:
amplifying an input communication signal with an amplifier to generate a first intermediate signal;
buffering the intermediate signal to generate a second intermediate signal;
feeding back the second intermediate signal to the amplifier; and
generating the output communication signal from the second intermediate signal.

41. The method of claim 36 wherein superimposing the output communication signal comprises:
amplifying an input communication signal with an amplifier to generate a first intermediate signal;
buffering the intermediate signal to generate a second intermediate signal;
feeding back the second intermediate signal to the amplifier;
coupling the second intermediate signal to the high-pass filter; and
generating the output communication signal from the second intermediate signal with the high-pass filter.

* * * * *